United States Patent
Petry

(10) Patent No.: US 8,410,197 B2
(45) Date of Patent: Apr. 2, 2013

(54) ORGANIC-CONTAINING PARTICULATE HAVING ELEVATED AUTO-IGNITION TEMPERATURES

(75) Inventor: Volker Petry, Hettenleidelheim (DE)

(73) Assignee: W. R. Grace & Co. -Conn., Columbia, MD (US)

( * ) Notice: Subject to any disclaimer, the term of this patent is extended or adjusted under 35 U.S.C. 154(b) by 1207 days.

(21) Appl. No.: 10/183,854

(22) Filed: Jun. 26, 2002

(65) Prior Publication Data

US 2003/0060554 A1 Mar. 27, 2003

Related U.S. Application Data

(60) Provisional application No. 60/303,294, filed on Jul. 6, 2001.

(51) Int. Cl.
*C08K 9/10* (2006.01)

(52) U.S. Cl. ........ 523/216; 106/272; 428/404; 428/405; 428/406; 428/407

(58) Field of Classification Search .......... 523/200–217; 524/430–433, 492–493; 252/381, 397–407; 106/272; 428/404–407
See application file for complete search history.

(56) References Cited

U.S. PATENT DOCUMENTS

| 4,123,586 A * | 10/1978 | Betts et al. ............... 428/391 |
| 4,124,562 A * | 11/1978 | Yui et al. .................. 523/209 |
| 4,228,297 A | 10/1980 | Haeberli et al. ............. 560/75 |
| 4,420,341 A | 12/1983 | Ferrigno ...................... 106/308 |
| 4,518,513 A * | 5/1985 | Lochner et al. ............... 252/62 |
| 4,603,158 A * | 7/1986 | Markham et al. ........... 524/100 |
| 4,705,571 A * | 11/1987 | Lange et al. .............. 106/287.1 |
| 5,458,973 A * | 10/1995 | Jeffs ............................ 428/402 |
| 5,477,917 A | 12/1995 | Salyer ...................... 165/104.26 |
| 5,510,237 A * | 4/1996 | Isogawa et al. .................. 435/2 |
| 5,516,814 A * | 5/1996 | Trotoir ......................... 523/122 |
| 5,635,557 A * | 6/1997 | Kimura et al. ............... 524/493 |
| 5,844,037 A * | 12/1998 | Lundgard et al. ............ 524/496 |
| 6,294,505 B1 * | 9/2001 | Luers et al. .................. 508/136 |
| 6,316,392 B1 * | 11/2001 | Heimann et al. ............ 508/136 |
| 6,420,456 B1 * | 7/2002 | Koski ............................ 523/213 |
| 6,593,400 B1 * | 7/2003 | Drummond ................. 523/205 |
| 6,686,006 B1 * | 2/2004 | Becraft et al. .............. 428/35.7 |
| 6,720,368 B2 * | 4/2004 | Field ............................ 523/200 |

FOREIGN PATENT DOCUMENTS

| EP | 0 751 175 | 1/1997 |
| WO | WO 01/04217 | 1/2001 |

\* cited by examiner

*Primary Examiner* — Peter Szekely
(74) *Attorney, Agent, or Firm* — William D. Bunch; Charles A. Cross

(57) ABSTRACT

The composition of this invention is an inorganic oxide particulate comprising at least 10% by weight organic material in which the particulate has an auto-ignition temperature which is at least 20° C. higher than the auto-ignition temperature of the particulate and organic material which does not contain antioxidant and/or inhibitor. Accordingly, a method has been developed in which one is able to elevate the auto-ignition temperature of such organic containing particulates. In a preferred embodiment the method comprises including antioxidant or inhibitor in the organic material prior to combining it with the inorganic oxide.

18 Claims, 1 Drawing Sheet

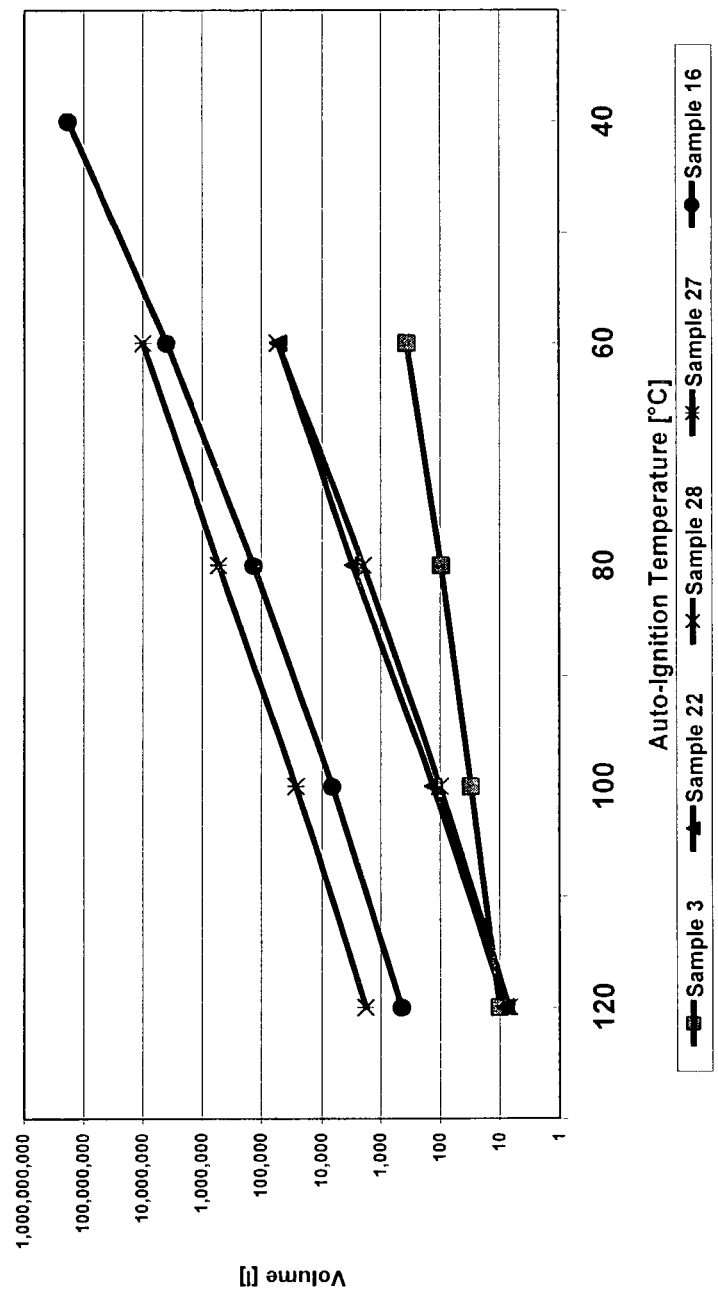

ORGANIC-CONTAINING PARTICULATE HAVING ELEVATED AUTO-IGNITION TEMPERATURES

This application claims priority under 35 U.S.C. §119 of the following provisional application Ser. No. 60/303,294 and filing date(s) Jul. 6, 2001

FIELD OF THE INVENTION

The invention relates to inorganic oxide particulates containing organic materials in which the auto-ignition temperature of the particulate has been elevated sufficiently to avoid auto-ignition of the particulate during conventional manufacturing, storage and handling conditions.

BACKGROUND OF THE INVENTION

Organic-containing particulates are known in the art. For example, wax treated particulated silica anti-block agents are widely used in plastic films to reduce or remove blocking tendencies between two surfaces of film. The wax imparts certain properties to the anti-block so that the silica anti-block is more compatible with the organic film in which it is included.

Wax coated particulated matting agents have also been used in architectural coatings, e.g., decorative paint. Such agents typically comprise inorganic oxide particulate. The matting agent imparts surface deformations to the dried coating thereby reducing the gloss in, and imparting a matte finish to, the coating after it dries. Certain inorganic particulates settle out of the coating when stored and are difficult to redisperse. When these matting agents are treated, however, the matting agent can at least be more easily dispersed when remixed.

More recently, it has been discovered that relatively high wax content matting agents work particularly well in matting ultraviolet curable coatings. These matting agents contain wax in amounts which are higher than that typically used for conventional matting agents. See WO01/04217. It has been discovered that when these high organic content treated particulates are stored in large enough volumes for certain periods of time, the temperatures of the material can occasionally reach levels at which auto-ignition begins. In general, as the volume of these high organic content particulates increases, the lower the temperature at which the particulate auto- or self-ignites after a given period of time. This had not been previously seen with the same volume of particulate containing smaller amounts of organic material.

BRIEF DESCRIPTION OF THE DRAWING

The FIGURE shows the relationship between volume of organic-containing particulate and the temperature at which that volume of particulate auto-ignites as measured by the test described in the Examples. The volume in the FIGURE is in liters and the temperature is in ° C.

SUMMARY OF THE INVENTION

The composition of this invention is an inorganic oxide particulate comprising at least 10% by weight organic material in which the particulate has an auto-ignition which is at least 20° C. higher than the auto-ignition temperature of the particulate without antioxidant and/or inhibitor.

Accordingly, a method has been developed in which one is able to elevate the auto-ignition temperature of such organic containing particulates. The method comprises including antioxidant or inhibitor in the organic compound.

DETAILED DESCRIPTION

The term "particulate" is used to refer to solid, either singularly or a collection of spheroids, fragments, or pieces of matter having a regular or irregular shape.

The term "auto-ignition" is used herein to mean a process which causes ignition of organic material which is surrounded by a heat source and air, after self-heating of the material. In the case of the organic materials referred to herein, the self heating process is caused by the oxidation of the hydrocarbons in the organic materials. Self heating can result in auto-ignition, with the "auto-ignition temperature" of a material referring to the temperature at which that material auto-ignites at a given volume. The auto-ignition temperatures referred to herein is measured using the test and methodology later described in the Examples.

The term "antioxidant" or "inhibitor" is used herein to refer to a substance, chemical, or other matter which retards, reduces or eliminates deterioration of another material by oxidation.

Inorganic oxides suitable for preparing the particulate described herein include precipitated inorganic oxides and inorganic oxide gels. Amorphous precipitated silica and silica gels are particularly suitable inorganic oxides. The particulate can also be prepared from mixed inorganic oxides including $SiO_2.Al_2O_3$, $MgO.SiO_2.Al_2O_3$. Mixed inorganic oxides are prepared by conventional blending or cogelling procedures.

Suitable inorganic oxide gels include, but are not limited to, gels comprising $SiO_2$, $Al_2O_3$, $AlPO_4$, $MgO$, $TiO_2$, and $ZrO_2$. The gels can be hydrogels, aerogels, or xerogels. A hydrogel is also known as an aquagel which is formed in water and as a result its pores are filled with water. A xerogel is a hydrogel with the water removed. An aerogel is a type of xerogel from which the liquid has been removed in such a way as to minimize any collapse or change in the gel's structure as the water is removed. Colloidal silica, talcs, mineral fillers and fumed silica can also be used.

The organic material referred to herein can be one or at least two of a number of organic compounds typically combined with, or used to coat or treat particulate inorganic oxides, especially inorganic oxides which have been particulated and/or micronized to median particle sizes in the range of 1 to 20 microns. Such organic compounds include but are not limited to polyolefins, amides, polyols and the like which are typically added to coatings and film products.

Examples of polyolefins include, but are not limited to, the following:

1. polymers that are derived from singly unsaturated hydrocarbons, such as polyolefins, e.g., polyethylene of low and high density, can optionally be cross-linked, polypropylene, polyisobutylene, polymethylbutene-1 and polymethylphentene-1;
2. mixtures of the homopolymers mentioned under 1, such as mixtures of polypropylene and polyethylene, polypropylene and polybutene-1, polypropylene and polyisobutylene;
3. copolymers mentioned under 1. are based, such as ethylene/propylene copolymers, propylene/butene-1 copolymers, propylene/isobutylene copolymers, ethylene/butene-1 copolymers, as well as terpolymers of ethylene and propylene with a diene, such as hexadiene, di-cyclopentadiene or ethylidenenorbornene.

Examples of amides include fatty acid amide used as slip agents for plastic films. Suitable fatty acid amides include oleamide, erucamide and stearamide.

Examples of polyols include polyols which have at least two OH groups, e.g., 3 to 5 OH groups, and chains with a molecular weight up to 2000, e.g., 100 to 800. Polyethylene glycols are suitable.

Another suitable polyol is alkoxylated pentaerythritol, whereby the alkoxy group is a $C_1$-$C_6$ alkoxy group, and in particular is a methoxy group, ethoxy group or butoxy group. The molar ratio of pentaerythritol to the alkoxy group for certain suitable polyols lies in the range from 1:0.5 to 1:25, e.g., 1:1 to 1:10 and in certain embodiments 1:1 to 1:5. Ethoxylated pentaerythritol, for example, is suitable.

The invention is particularly suitable for inorganic oxide particulates containing polyolefin waxes having a melting point in the range of 60 to 120° C. and even more particularly suitable for those having melting points in the range of 60 to 90° C. These and other waxes are disclosed in WO 01/04217, the contents of which are incorporated herein by reference. Suitable commercially available waxes include Vestowax from Degussa.

The particulate of this invention comprises at least ten (10) percent by weight organic material based on the weight of the inorganic oxide. Typical organic contents for particulates contemplated herein range from 10% to 50% by weight, with contents of at least 20% organic being present in embodiments prepared for flatting agents and/or antiblocking agents. The remainder of the particulate, e.g., 90 to 50% by weight, is made up of the inorganic oxide and any residual species and compounds present from manufacturing the inorganic oxide. The remainder may also include other additives included for application-specific purposes. Any manufacturing residue or additives will range from 0.01-5% by weight of the particulate.

It has been found that when inorganic oxide particulates comprises at least ten percent by weight organic material such as that described above, and the particulate is stored in relatively large volumes over certain periods of time, auto-ignition of the particulate can occur at conventional manufacturing, handling and storage conditions, e.g., at temperatures ranging from 25-80° C. This had not been previously seen by Applicant with inorganic oxide particulate per se, organic particulate per se or inorganic oxide particulate containing smaller amounts of organic material, e.g., less than 10% by weight organic.

It has been found that adding antioxidant to the organic material at sufficient levels will elevate the auto-ignition temperature of the particulate, thereby suppressing its effect under typical manufacturing, handling and storage conditions. Without being held to any particular theory, it is believed that the auto-ignition occurs as a result of free-radicals forming in the organic materials and then those radicals creating exothermic oxidation reactions with the hydrocarbons in the organic material. The auto-ignition temperature is elevated in the presence of antioxidants because reactive hydrogens from the antioxidants block the formation of free radicals (e.g., oxygen) and/or they otherwise react with free radicals to form less reactive compounds. It is further believed that the relatively high contact surface area of, e.g., silica, its pH, and trace elements therein such as Fe, Ti, Al, and Ni found in inorganic oxides may be catalyzing the formation of these radicals thus offering a possible explanation to why auto-ignition of organic material alone is not seen at these conditions.

Suitable antioxidants include those known in the art. Hydroxyalkylphenol-based antioxidants are particularly suitable. U.S. Pat. No. 4,228,297 discloses suitable hydroxyalkylphenol based antioxidants, the contents of which are incorporated herein by reference. More specifically, antioxidants of the following formulas are suitable.

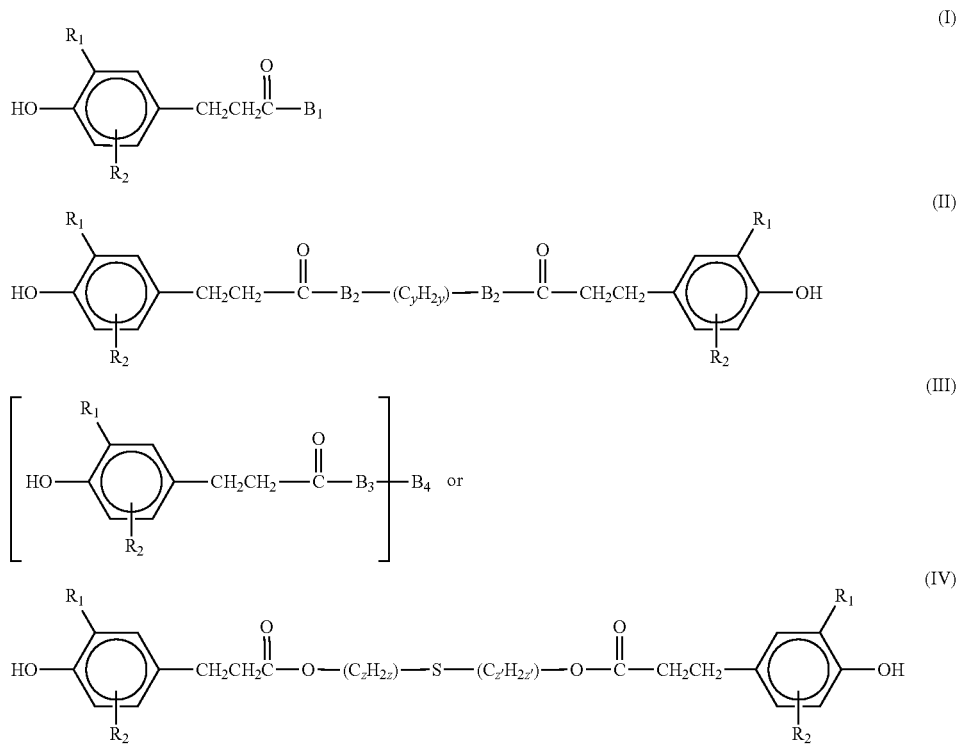

in which for formula (I),
R₁ and R₂ independently of each other represent an alkyl group having from 1 to 6 carbon atoms;
B₁ represents —O—(CₓH₂ₓ)—H or

wherein x has a value from 6 to 30, inclusively,
Y₁ represents an alkyl group having from 1 to 18 carbon atoms or a cycloalkyl group having from 5 to 12 carbon atoms and
Y₂ represents hydrogen or an alkyl group having from 1 to 18 carbon atoms, or a cycloalkyl group of 5 to 12 carbon atoms
Y₁ and Y₂ together with the nitrogen atom to which they are linked form a piperidino ring, and for (II)
B₂ each represent —O— or —NH— and
y has a value from 2 to 10, inclusively, for (III)
B₃ represents —O—CH₂— and
B₄ represents

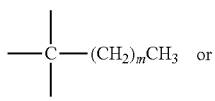

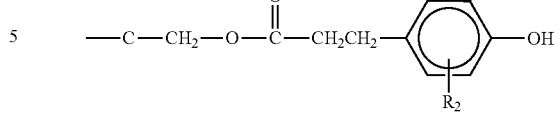

wherein
R₁ and R₂ are as defined above, and m is 0 to 6, or
B₃ represents —NH—(CH₂)ₘ— and
B₄ represents

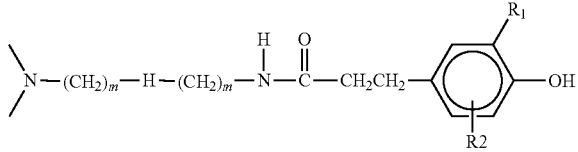

wherein m has a value from 2 to 6, inclusively, and for (IV), R₁ and R₂ are as defined above, and each of z and z' have a value from 2 to 12, inclusively. The formulas above more especially include esters having the formulae

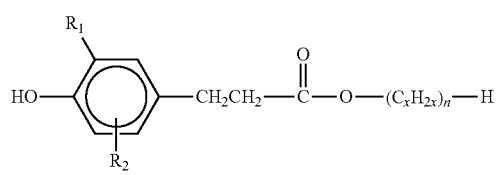
(I')

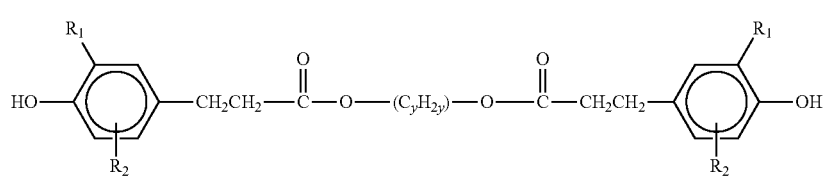
(II')

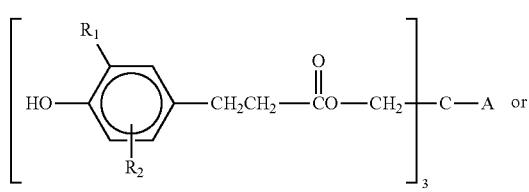
(III')

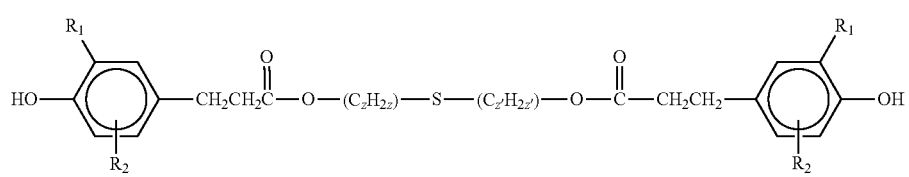
(IV')

in which formulae:
  $R_1$, $R_2$, x and y are as defined above,
  each of z and z' have a value of 2 or 3, and
  A represents —$CH_2CH_3$ or a radical of the formula

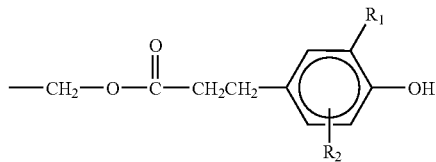

For illustration purposes some specific examples of compounds of formulae I to IV are mentioned.
Compounds of Formula I
n-hexyl-β-(2-methyl-5-t-butyl-hydroxyphenyl) propionate
n-octyl-β-(3,5-di-t-butyl-4-hydroxyphenyl) propionate
n-decyl-β(3-ethyl-5-t-butyl-4-hydroxyphenyl) propionate
n-hexadecyl-β-(3-n-hexyl-5-isopropyl-5-hydroxyphenyl) propionate
n-octadecyl-62-(3,5-di-t-butyl-4-hydroxyphenyl) propionate
n-dodecyl-β-(3-ethyl-5-t-butyl-4-hydroxyphenyl) propionate
N-methyl-β-(3,5-di-t-butyl-4-hydroxyphenyl) propionamide
N,N-diethyl-β-(3-methyl-5-isopropyl-4-hydroxyphenyl) propionamide
N-n-hexyl-β-(3,5-di-isopropyl-4-hydroxyphenyl) propionamide
N-n-decyl-β-(3,5-di-t-butyl-4-hydroxyphenyl) propionamide
N-cyclopropyl-β-(3,6-di-t-butyl-4-hydroxyphenyl) propionamide
N-cyclohexyl-β-(3,5-di-t-butyl-4-hydroxyphenyl) propionamide
piperazino-β-(2-ethyl-5-isopropyl-4-hydroxyphenyl) propionamide
Compounds of Formula II
ethylene-bis-β-(3,5-di-t-butyl-4-hydroxyphenyl)propionate
isopropylene-bis-β(3-methyl-5-t-butyl-4-hydroxyphenyl) propionate
1,4-butylene-bis-β-(3,5-isopropyl-4-hydroxyphenyl)propionate
1,6-hexylene-bis-β-(3,5-di-t-butyl-4-hydroxyphenyl)propionate
1,7-heptylene-bis-β-(3,4-di-t-butyl-4-hydroxyphenyl)propionate
1,8-octylene-bisβ-(3,5-di-t-butyl-4-hydroxyphenyl)propionate
1,2-bis-{3-(3-methyl-5-isopropyl-4-hydroxyphenyl) propionamido}ethane
1,2bis-{3-(3,5-di-t-butyl-4-hydroxyphenyl) propionamido}propane
1,6-bis-{3-(2-ethyl-5-t-butyl-4-hydroxyphenyl) propionamido}hexane
1,8-bis-{3-(3,5-di-t-butyl-4-hydroxyphenyl) propionamido}octane.
Compounds of Formula III
1,1,1-trimethylol-propane-{3-(3',5'-di-t-butyl-4'-hydroxyphenyl)-propionate}
pentaerythritol tetrakis-{3-(2'-methyl-5'-t-butyl-4'-hydroxyphenyl)-propionate}
pentaerythritol tetrakis-{3-(3',5'-di-t-butyl-4'-hydroxyphenyl)-propionate}
tetrakis-{3(3,5-di-t-butyl-4-hydroxyphenyl) propionamidomethyl}methane
tetrakis-(2-{3-(3-methyl-5-isopropyl-4-hydroxyphenyl) propionamido}ethyl-ethylendiamine
Compounds of Formula IV
thio-bis-{ethylene-3(3,5-di-t-butyl-4-hydroxyphenyl)propionate}
thio-bis-{isopropylene-3-(3,5-di-t-butyl-4-hydroxyphenyl) propionate}

Other suitable antioxidants include triarylphosphites and mixtures thereof, particularly mixtures of the same with phenolic antioxidants and stabilizers. Such compounds are disclosed in U.S. Pat. No. 4,290,441, the contents of which are incorporated by reference.

A particularly suitable triarylphosphite is that of the general formula

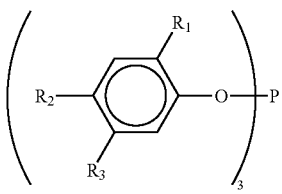

wherein $R_1$ represents tertiary-butyl (sometimes referred to herein as "tert.-butyl), 1,1-dimethylpropyl, cyclohexyl or phenyl, and one of $R_2$ and $R_3$ is hydrogen and the other is hydrogen, methyl, tertiary-butyl, 1,1-dimethylpropyl, cycohexyl or phenyl.

The symbols in the formula I preferably have the following meanings:
  $R_1$ represents tertiary-butyl or 1,1-dimethylpropyl, and one of
  $R_2$ and $R_3$ represents hydrogen, and the other represents hydrogen, methyl, tertiary-butyl or 1,1-dimethylpropyl.
A particularly preferred embodment is one wherein
  $R_1$ represents tertiary-butyl, and one of
  $R_2$ and $R_3$ represents hydrogen, and the other represents hydrogen, methyl or tertiary-butyl.
Compounds of the formula I that are especially suitable are, for example:
tris-(2,5-ditert.-butylphenyl)-phosphite,
tris-(2-tert.-butylphenyl)-phosphite,
tris-(2-phenylphenyl)-phosphite,
tris-[2-(1,1-dimethylpropyl)-phenyl]-phosphite,
tris-[2,4-di-(1,1-dimethylpropyl)-phenyl]-phosphite,
tris-(2-cyclohexylphenyl)-phosphite, and
tris-(2-tert.-butyl-4-phenylphenyl)-phosphite;
or, in particular:
tris-(2,4-ditert.-butylphenyl)-phosphite.

The following are be mentioned as specific examples of phenolic compounds which can be included with the above-mentioned triarylphosphites.

1. Single 2,6-dialkylphenols, such as
2,6-di-tert.-butyl-4-methylphenol, 2,6-di-tert.-butyl-4-methoxymethylphenol or 2,6-di-tert.-butyl-4-methoxyphenol.

2. Bisphenols, such as 2,2'-methylene-bis-(6-tert.-butyl-4-methylphenol), 2,2'-methylene-bis-(6-tert.-butyl-4-ethylphenol). 2,2'-methylene-bis-[4-methyl-6-(α-methylcyclohexyl)-phenol], 1,1-bis-(5-tert.-butyl-4-hydroxy-2-methylphenyl)-butane, 2,2-bis-(5-tert.-butyl-4-hydroxy-2-methylphenyl)-butane, 2,2-bis-(3,5-di-tert.butyl-4-hydroxyphenyl)-propane, 1,1,3-tris-(5-tert.butyl-4-hydroxy-2-methylphenyl)-butane, 2,2-bis-(5-tert.-butyl-4-hydroxy-2-methylphenyl)-4-n-dodecylmercapto-butane, 1,1,5,5-tetra-(5-tert.-butyl-4-hydroxy-2-methypheny)-pentane, ethylene glycol-bis-[3,3-bis-(3'-tert.-butyl-4'-hydroxyphenyl)-butyrate], 1,1-bis-(3,5-dimethyl-2-hydroxyphenyl)-3-(n-dodecylthio)-butane, or 4,4'-thio-bis-(6-tert.-butyl-3-methylphenol).

3. Hydroxybenzyl aromates, such as
1,3,5-tri-(3,5-di-tert.-butyl-4-hydroxybenzyl)-2,4,6-trimethylbenzene, 2,2-bis-(3,5-di-tert.-butyl-4-hydroxybenzyl)-malonic acid-dioctadecyl ester, 1,3,5-tris-(3,5-di-tert.-butyl-4-hydroxybenzyl)-isocyanurate, or 3,5-di-tert.-butyl-4-hydroxybenzyl-phosphonic acid-diethyl ester.

4. Amides of β-(3,5-di-tert.-butyl-4-hydroxyphenyl)-propionic acid, such as
1,3,5-tris-(3,5-di-tert.-butyl-4-hydroxyphenyl-propionyl-hexahydro-s-triazine, N,N'-di-(3,5-di-tert.butyl-4-hydroxyphenyl-propionyl)-hexamethylenediamine.

5. Esters of β-(3,5-di-tert.butyl-4-hydroxyphenyl)-propionic acid with mono- or polyvalent alcohols, such as with methanol, octadecanol, 1,6-hexanediol, ethylene glycol, thiodiethylene glycol, neopentyl glycol, pentaerythritol, tris-hydroxyethyl-isocyanurate.

6. Spiro compounds, such as
diphenolic spiro-diacetals or spiro-diketals, such as 2,4,8,10-tetraoxaspiro-[5,5]-undecane substituted in the 3- and 9-position with phenolic radicals, such as 3,9-bis-(3,5-di-tert.butyl-4-hydroxyphenyl)-2,4,8,10-tetraoxaspiro-[5,5]-undecane, 3,9-bis-[1,1-dimethyl-2-(3,5-ditert.-butyl-4-hydroxyphenyl)-ethyl]-2,4,8,10-tetraoxaspiro-[5,5]-undecane.

Particularly preferred phenolic compounds to include with the triarylphopsphites are:
1,3,5-tri-(3,5-di-tert.-butyl-4-hydroxybenzyl)-2,4,6-trimethylbenzene.
pentaerythritol-tetra[3-(3,5-di-tert.-butyl-4-hydroxyphenyl)-propionate],
β-(3,5-di-tert.-butyl-4-hydroxyphenyl)-propionic acid-n-octadecyl ester,
thiodiethylene glycol-β-[4-hydroxy-3,5-di-tert.-butyl-phenyl]-propionate,
2,6-di-tert.-butyl-4-methyl-phenol, and
3,9-bis-[1,1-dimethyl-2-(3,5-ditert.-butyl-4-hydroxyphenyl)-ethyl]-2,4,8,10-tetraoxaspiro-[5,5]-undecane.

The antioxidant is selected based on the organic material in the particulate and the desired minimum auto-ignition temperature required for the application. Certain antioxidants are more preferable for certain organics. Certain applications requiring long periods of storage time and/or at larger volumes may also require larger amounts of antioxidant.

The antioxidants are added to the organic material in amounts sufficient to elevate the auto-ignition temperature of the organic material-containing particulate by about 15° C. to about 150° C. compared to the auto-ignition temperature of the same volume of particulate containing organic material which does not include an antioxidant. Depending on the selection and amount of antioxidant and/or inhibitor, the invention can have an auto-ignition temperature which is at least 20° C. higher, preferably at least 30° C. higher, and up to at least 100° C. higher than that of the same volume of particulate, but without antioxidant. The amount of antioxidant depends on the particular organic compound and the anti-oxidant/inhibitor chosen. Typically the anti-oxidant/inhibitor amount ranges from 500-5,000 ppm, and more typically ranges from 1,000-2,000 ppm based on the weight of organic material. The antioxidant and/or inhibitor is added using conventional blending techniques. It is preferable to add antioxidant and/or inhibitor to the organic material prior to blending the organic material with the inorganic oxide and/or any other additives. In typical applications, it is desired that the auto-ignition temperature of the invention be higher than the average temperature expected for manufacturing, handling and storage of the particulate. Therefore, the temperature should be for typical applications at least 100° C. and preferably at least 185° C.

In embodiments in which the particulates are prepared from micronized inorganic oxides such as those used as matting agents or anti-blocking agents, the organic can be incorporated through milling techniques, e.g., jet milling, air milling, or the like, in which organic is added to the inorganic oxide, e.g., silica, while the inorganic oxide is being milled to the particle size desired. Organic material can also be added to an inorganic oxide particulate in conventional mixers and/or granulators.

In embodiments containing inorganic oxide particulates typically used for flatting agents and/or anti-blocking agents, the inorganic oxide is preferably those porous particulates known in the art. Particularly preferred inorganic oxide particulates for those uses are those prepared from silica gel having pore volumes in the range of 0.8 to 2.1 cc/g, and particle sizes in the range of 2-12 microns. The silica gel can be hydrogel, xerogel or aerogel.

The following examples of the invention are illustrative and are not intended to limit in any way the invention as recited in the appended claims.

EXAMPLES

Comparison samples and samples of the invention were prepared by adding antioxidant and/or inhibitor to the organic material prior to adding the organic and inorganic oxide to a fluid energy mill (AFG 400) run at an air inlet temperature of 190° C. The classifier speed and feed rate were set to achieve the desired average particle size of the organic containing product. The inorganic oxide used in the samples and comparisons were all prepared from silica gel having the APS, PV and oil absorption values mentioned in Table 1.

The average particle size (APS), pore volume (PV) of the inorganic oxide added, oil absorption, organic material content in parts per million (ppm), type of organic material, antioxidant (AO), antioxidant inhibitor content, the type of AO and/or inhibitor and auto-ignition temperature for each sample are all included in Table 1 below, except where noted with a dash (-). Other terms appearing in Table 1 are defined below.
FT=Fischer-Tropsch wax
Polyol=polyethylene glycol
microcrystalline wax=Bareco Be Square Amber 195G Wax
Fatty acid amide=erucamide The auto-ignition temperature referred to herein is measured in the following manner and in accordance with VDI 2263. A wire mesh basket with an edge length of 5 cm is filled with the sample particulate and stored for 5 h at 110° C. After that period, the oven temperature is increased by 0.5° C./min up to 400° C. Both the oven and sample temperature are recorded. If the maximum sample temperature is measured higher than 400° C., it is deemed that auto-ignition has occurred and the temperature at which the sample increases at a faster rate than the pre-set temperature rate of the oven, is called the "auto-ignition temperature".

TABLE 1

| Matting Agent Sample No. | APS[1] [μm] | PV[2] [ml/g]/ Oil Absorption[3] [g/100 g] | Organic Content[4] | Type of Organic | Antioxidant/ Inhibitor Content [ppm] | AO | AO-Type | Auto-Ignition Temperature [° C.] |
|---|---|---|---|---|---|---|---|---|
| 1 | 3.7 | 1.4/200 | 20 | Paraffin/FT wax | 0 | — | — | 180 |
| 2 | 6.5 | 1.1/120 | 20 | Paraffin/FT wax | 0 | — | — | 166 |
| 3 | 3 7 | 1.1/120 | 20 | Paraffin/FT wax | 0 | — | — | 160 |
| 4 | 3.7 | 1.1/120 | 20 | Paraffin/FT wax | 1000 | Irganox 1010 | $O_2$-radical Catcher | 195 |
| 5 | 3 7 | 1 1/120 | 20 | Paraffin/FT wax | 1000 | Vitamin E, ie, α-Tocopherol | Radical scavenger | 187 |
| 6 | 3.7 | 1.1/120 | 20 | Paraffin/FT wax | 1000 | Irganox 1076 | $O_2$-radical Catcher | 190 |
| 7 | 3.7 | 1.1/120 | 20 | Paraffin/FT wax | 1000 | Irgaphos 168 | Hydroperoxide decompositor | 183 |
| 8 | 3.7 | 1.1/120 | 20 | Paraffin/FT wax | 1000 | BHT | Process stabilizer | 181 |
| 9 | 3.7 | 1.1/120 | 20 | Paraffin/FT wax | 1000 | Hydrochinon | $O_2$-radical Catcher | 182 |
| 10 | 3.7 | 1.1/120 | 12 | Paraffin/FT wax | 0 | — | — | 184 |
| 11 | 3.7 | 1.1/120 | 16 | Paraffin/FT wax | 0 | — | — | 182 |
| 12 | 3.7 | 1.1/120 | 20 | Paraffin/FT wax | 0 | — | — | 180 |
| 13 | 3 7 | n.a/65 | 10 | Paraffin/FT wax | 0 | — | — | 195 |
| 14 | 3 7 | 1.1/120 | 20 | Paraffin/FT wax | 1000 | HP 2225F | Blend | 191 |
| 15 | 3 7 | 0.8 | 20 | Paraffin/FT wax | 1000 | HP 2225F | Blend | 198 |
| 16 | 3.7 | 1.1/120 | 20 | Paraffin/FT wax | 2000 | HP 2225F | Blend | 198 |
| 17 | 4.7 | 1.1/120 | 20 | Paraffin/FT wax | 2000 | HP 2225F | Blend | 193 |
| 18 | 7.2 | 1.1/120 | 20 | Paraffin/FT wax | 2000 | HP 2225F | Blend | 195 |
| 19 | 5.5 | 2.0 | 12.5 | Polyol | 0 | — | — | 146 |
| 20 | 5.5 | 2.0 | 12.5 | Polyol | 2000 | Irganox 3052 | C-radical Catcher | 163 |
| 21 | 5.5 | 2.0 | 12.5 | Polyol | 4000 | Irganox 3052 | C-radical Catcher | 174 |
| 22 | 8.0 | 2.0/300 | 15 | Microcrystalline Wax/Polyol | 0 | — | — | 125 |
| 23 | N.M. | N.M. | 30 | Fatty acid amide | 30000 | Irganox 1010, 1076, Irgaphos 168 | Blend | 236 |
| 24 | 4.7 | 2.0/300 | 10 | Microcrystalline Wax | 0 | — | — | 241 |
| 25 | 7.8 | 1.8/300 | 10 | Microcrystalline Wax | 0 | — | — | 231 |
| 26 | 11.0 | 1.8/300 | 10 | Microcrystalline Wax | 0 | — | — | 230 |
| 27 | 7.8 | 1.8/280 | 18 | Microcrystalline Wax/Polyol | 0 | — | — | 206 |
| 28 | 80 | 1.8/300 | 15 | Microcrystalline Wax | 0 | — | — | 142 |

N.M. Not Measured
[1]Measured by a Malvernsizer S particle size analyzer
[2]Measured using BJA nitrogen porosimetry
[3]Measuring using linseed oil according to test methods described in DIN ISO 787-5
[4]Weight % wax based on silica
BHT = Butylatedhydroxytoluene (E 321)
Irgafos ® and Irganox ® are tradenames of CIBA Specialty Chemicals, Inc., and the various grades of Irganox antioxidant (e.g., 1010, 1076, HP136 and 2225 FF) and Irgafos 168 are commercially available from Ciba Specialty Chemicals, Inc.

The results in Table 1 show that the addition of antioxidant/inhibitor increases the auto-ignition temperature of the particulate compared to similar samples that did not contain antioxidant and/or inhibitor. That is seen by a comparison of results for Samples 3, 14 and 16, wherein the former does not contain an antioxidant/inhibitor and the latter two contain 1000 and 2000 ppm Irganox® HP 2225FF, respectively.

The results for Samples 4-6 indicate that the type of antioxidant/inhibitor affects the auto-ignition temperature. It is shown that an $O_2$-"radical catcher" is effective for organic material comprising paraffin and a Fischer-Tropsch Wax. Example 14 indicates that a blend of antioxidant/inhibitor may be even more preferred because the blend contains not only an $O_2$-catcher, but also contains an agent for breaking down hydrogen peroxide and carbon radical "catchers."

It is believed that oxidizing self-heating and auto-ignition depends upon the sample volume and the duration of the temperature exposure. In general, increased sample volume will result in auto-ignition at lower surrounding temperatures at a given volume. Auto-ignition temperatures can be extrapolated for certain volumes of particulate. See May 1990 edition of VDI 2263, Section 1.4 and 1.4.2.3. therein. Auto-ignition temperatures were extrapolated according to VDI 2263 for certain Samples from Table 1, with the results appearing in Table 2 below and graphically illustrated in the FIGURE. Volumes are reported in liters. Accordingly, selected antioxidant type and amounts can be determined for particulates based on expected volumes and manufacturing, handling and storgage conditions.

TABLE 2

Volume vs. Auto-Ignition Temperature

| Sample/ Temp [° C.] | Volume Sample 3 [I] | Volume Sample 16 [I] | Volume Sample 22 [I] | Volume Sample 27 | Volume Sample 28 |
|---|---|---|---|---|---|
| 120 | n.a. | 441 | n.a. | n.a. | n.a. |
| 100 | 10 | 6633 | 8 | 1800 | 7 |
| 80 | 30.2 | 135,801 | 130 | 27,000 | 100 |
| 60 | 96 | 39,954,534 | 3,000 | 525,000 | 2,000 |
| 40 | 363 | 181,106,795 | 54,000 | 1,000,000 | 55,000 |

The extrapolated data above is based on samples in Table 1.

What is claimed:

1. A plurality of discreet inorganic oxide particulates comprising a coating of organic material wherein said organic material is present in an amount of at least 10% by weight based on the weight of inorganic oxide and an antioxidant and/or inhibitor, wherein the particulates at a given volume have an auto-ignition temperature which is at least 20° C. higher than the auto-ignition temperature of base particulates, the base particulates being the particulates and organic material without an antioxidant or inhibitor.

2. The particulates of claim 1 wherein the auto-ignition temperature of the particulates is at least 100° C.

3. The particulates of claim 1 wherein the antioxidant comprises

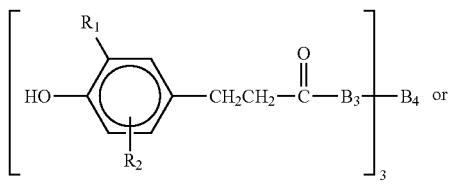

in which
$R_1$ and $R_2$ independently of each other represent an alkyl group having from 1 to 6 carbon atoms
$B_3$ represents —O—$CH_2$— and
$B_4$ represents

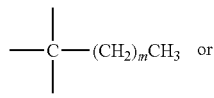

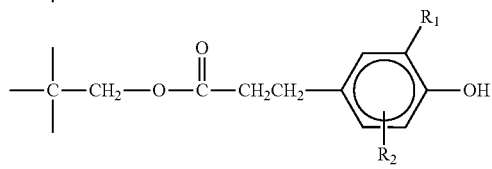

wherein
$R_1$ and $R_2$ are as defined above, and m is 0 to 6.

4. The particulates of claim 1 wherein the antioxidant comprises

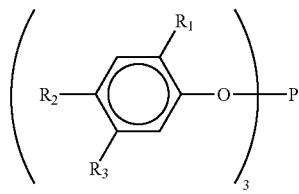

wherein $R_1$ represents tertiary-butyl, 1,1-dimethylpropyl, cyclohexyl or phenyl, and one of $R_2$ and $R_3$ is hydrogen and the other is hydrogen, methyl, tertiary-butyl, 1,1-dimethylpropyl, cyclohexyl or phenyl.

5. The particulates of claim 3 further comprising

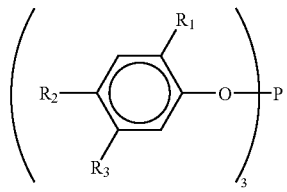

wherein $R_1$ represents tertiary-butyl, 1,1-dimethylpropyl, cyclohexyl or phenyl, and one of $R_2$ and $R_3$ is hydrogen and the other is hydrogen, methyl, tertiary-butyl, 1,1-dimethylpropyl, cyclohexyl or phenyl.

6. The particulates of claim 1 wherein the inorganic oxide is a member of the group consisting of silica, talc and mineral fillers.

7. The particulates of claim 6 wherein the inorganic oxide is porous and has a pore volume of 0.4 cc/g to 2.0 cc/g.

8. The particulates of claim 7 wherein the porous inorganic oxide is silica.

9. The particulates of claim 1 having an average particle size in the range of 2 to 12 microns.

10. The particulates of claim 1 comprising 10 to 50% by weight organic material.

11. The particulates of claim 1 comprising at least 20% by weight organic material.

12. A method of elevating auto-ignition temperatures of a plurality of discreet inorganic oxide particulates comprising a coating of organic material in an amount of at least 10% by weight based on the weight of inorganic oxide, the method comprising including anti-oxidant or inhibitor with the organic material-containing inorganic oxide in order to raise the auto-ignition temperature of the particulates at least 20° C. higher than the auto-ignition temperature of the particulates without the antioxidant or inhibitor.

13. A method of claim 12 wherein the antioxidant comprises a compound

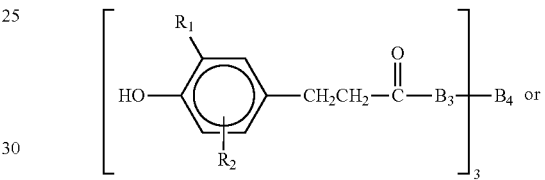

in which
$R_1$ and $R_2$ independently of each other represent an alkyl group having from 1 to 6 carbon atoms.
$B_3$ represents —O—$CH_2$— and
$B_4$ represents

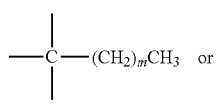

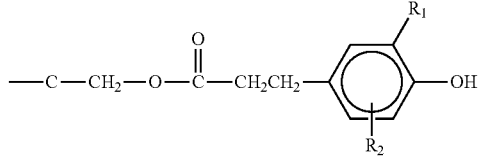

wherein
$R_1$ and $R_2$ are as defined above, and m is 0 to 6.

14. A method of claim 12 wherein the antioxidant comprises

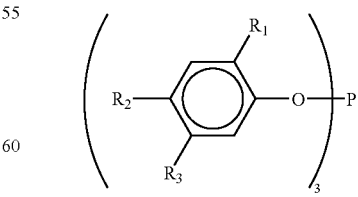

wherein $R_1$ represents tertiary-butyl, 1,1-dimethylpropyl, cyclohexyl or phenyl, and one of $R_2$ and $R_3$ is hydrogen and the other is hydrogen, methyl, tertiary-butyl, 1,1-dimethylpropyl, cyclohexyl or phenyl.

15. A method of claim 13 in which the antioxidant further comprises

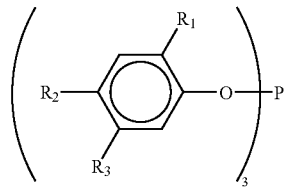

wherein $R_1$ represents tertiary-butyl, 1,1-dimethylpropyl, cyclohexyl or phenyl, and one of $R_2$ and $R_3$ is hydrogen and the other is hydrogen, methyl, tertiary-butyl, 1,1-dimethylpropyl, cyclohexyl or phenyl.

16. A method of claim 12 comprising including the antioxidant and/or inhibitor in the organic material prior to combining the organic material with the inorganic oxide.

17. A method of claim 12 wherein the inorganic oxide is silica.

18. The particulates of claim 1 wherein the inorganic oxide is silica.

* * * * *